Dec. 5, 1961    J. MELILL ET AL    3,011,254
DOUBLE DIFFERENTIAL PRESSURE HONEYCOMB SANDWICH PANEL BRAZING
Filed April 6, 1959    4 Sheets-Sheet 1

INVENTORS
JOSEPH MELILL
CARL J. MUSER
CALVIN H. HALL
BY
Arthur W. Fuzak
ATTORNEY INVENTORS
JOSEPH MELILL
CARL J. MUSER
CALVIN H. HALL
BY Arthur W. Fazak
ATTORNEY Dec. 5, 1961  J. MELILL ET AL  3,011,254
DOUBLE DIFFERENTIAL PRESSURE HONEYCOMB SANDWICH PANEL BRAZING
Filed April 6, 1959  4 Sheets-Sheet 3

INVENTORS
JOSEPH MELILL
CARL J. MUSER
CALVIN H. HALL
BY Arthur W. Fugak
ATTORNEY

| | CONVENTIONAL | DOUBLE DIFFERENTIAL PRESSURE |
|---|---|---|
| SIZE OF PANEL | 27" X 144" | 27" X 144" |
| CORE SIZE | $\frac{1}{4}$" CELL X $\frac{1}{2}$" HEIGHT | $\frac{1}{4}$" CELL X $\frac{1}{2}$" HEIGHT |
| CELL WALL THICKNESS | .0015" | .0015" |
| WEIGHT OF RETORTS REQUIRED | 3376 lbs | 2050 lbs |
| FURNACE CAPACITY USED | 20,000,000 B.T.U./HOUR | 20,000,000 B.T.U./HOUR |
| FURNACE TIME | 9 HOURS | 3 HOURS |
| VOLUME OF ARGON USED | 1200 CU. FT. | 120 CU. FT. |
| GRAPHITE PLANES | 3" THICK | 1$\frac{1}{2}$" THICK |
| PANEL CONDITION | UNACCEPTABLE – DISCONTINUOUS BOND, WRINKLED | ACCEPTABLE – CONTINUOUS BOND, NOT WRINKLED |

FIG. 5

United States Patent Office 3,011,254
Patented Dec. 5, 1961

3,011,254
DOUBLE DIFFERENTIAL PRESSURE HONEY-
COMB SANDWICH PANEL BRAZING
Joseph Melill, Torrance, Carl J. Muser, Arcadia, and
Calvin H. Hall, Los Angeles, Calif., assignors to North
American Aviation, Inc.
Filed Apr. 6, 1959, Ser. No. 804,244
22 Claims. (Cl. 29—471.1)

This invention pertains to the fabrication of honeycomb core sandwich panels and is more specifically directed to the brazing of sandwich panel face sheets to a cellular core by a double differential pressure method which insures maintenance of the required contacting relationship between the face sheets and core while preventing their contamination and oxidation during the brazing cycle.

Honeycomb sandwich panels constructed of high-strength, high-temperature and corrosion resistant metals, such as stainless steel and titanium, have become important materials of construction because of their high strength-weight ratios. Nevertheless, conventional methods for the fabrication of honeycomb sandwich panels have proven to be commercially unacceptable. Such methods are not only excessively costly, but more critically, are incapable of consistently producing a continuous bond between the panel face sheets and the panel core.

The sand-seal method, which is illustrative of conventional techniques, requires the use of an outer retort consisting of a bottom sheet having an annular upstanding trough containing sand and a cover member whose peripheral edge is embedded in the sand in order to seal the interior of the outer retort from the atmosphere. The sandwich panel to be brazed is placed on a precision-surface-machined graphite reference plane and the panel and reference plane placed in an inner retort which is sealed by seam or butt welding the adjoining edges of its base and cover members. This inner retort is put in the outer retort, a second graphite mass placed on the upper cover sheet of the inner retort and the outer retort sand-sealed. Tube connections are provided to the interiors of both the inner and outer retorts and an inert gas is continuously flowed through both retorts.

The complete assembly is heated for a period sufficient to achieve brazing temperatures at the surfaces of contact between the face sheets and cellular core and subsequently removed from the source of heat and permitted to cool. A "running purge" of inert gas is used throughout the heating and cooling cycles.

Among the most important deficiencies of conventional honeycomb fabrication techniques is that the presence of graphite in close adjacency to the sandwich panel to be brazed causes severe contamination of the brazing alloy employed. Although graphite has a higher thermal conductivity and greater high temperature strength than most metals, therefore being most suitable for use in methods requiring employment of reference tooling, it is characterized by severe "outgassing" at high temperatures and partial pressures. In order to decrease the tendency towards outgassing, the graphite blocks which are intended for use as reference planes in conventional brazing methods must by cyclically subjected to high temperatures and partial pressures in an inert atmosphere. Even prolonged cyclical treatments of this type do not completely remove all absorbed gases and moisture with the result that oxidizing agents are outgassed during panel brazing. As a consequence, the surfaces to be brazed undergo oxidization and the brazing alloy becomes contaminated, thereby preventing acquisition of a continuous, strong bond between the core and the panel face sheets.

This difficulty persists notwithstanding the employment of continuous purging of the brazing retorts with an inert gas during the brazing cycle. Even though an inert gas such as argon is used, impurities normally present in the gas will not only tend to be absorbed by the filler metal, thus imparing its ability to wet the metal surfaces which are to be joined, but will also tend to oxidize the surfaces to be joined with the same result. The extent of such oxidation and of impurities absorbed by the filler metal, of course, depends upon the quantity of argon or other inert gas which comes in contact with the brazing alloy. In existing methods, use of a continuous purge during the complete brazing cycle very substantially increases the extent of oxidation and the quantity of impurities absorbed by the filler metal, thus critically affecting the ability of the brazing alloy to wet the surfaces intended to be joined.

Another important deficiency of conventional methods is that they typically require the use of very massive graphite blocks as tooling during the brazing cycle. The employment of large tooling masses in such methods is not only extravagant of labor, materials and furnace power requirements and capacity, but is also undesirable because the increased heating and cooling rates resulting therefrom cause a substantial reduction in the physical properties of the material of which the sandwich panels are constructed. The necessity for use of massive tooling stems from the presence of thermal stresses in the tooling which develop as a consequence of unavoidably uneven heating rates. Massive graphite tooling is also required because, at brazing temperatures, differential pressures tend to compress the retort and cause application of unequal loads to the tooling. In order to withstand the so caused unequal stresses it has been essential to use graphite in massive quantities.

A further most substantial hazard to which conventional brazing methods are subject is that of leakage during the brazing cycle. In the sand-seal method, for example, pressure inside the outer retort is greater than the pressure within the inner retort with the result that the development of a leak in the inner retort will cause flow of gases from the outer retort into the iner retort. In a situation, which is not at all unusual in the brazing of large honeycomb sandwich panels by this method, where the outer retort also develops a leak, oxygen and moisture wil flow directly from the atmosphere and into contact with the surfaces to be brazed. Obviously, in such case, no bond will result.

It is, therefore, a principal object of our invention to provide a method for fabricating honeycomb sandwich panels which will effectively minimize the foregoing defects of conventional methods.

It is a more specific object of our invention to provide a method which utilizes a double differential pressure concept for maintaining sandwich panel face sheets in contact with a cellular core while insuring their freedom from contamination during brazing. In our method, differential pressures between the atmosphere and the interior of an inner retort urges the face sheets into the appropriate contacting relationship with the core during the brazing operation. Since the cover sheets of the retort are flexible at brazing temperatures, the atmosphere to inner retort differential pressure causes such local deflection in the sheets as is required in order to cause continuous abutment of the surfaces of joinder between the panel face sheets and the panel core. In addition, the differential pressure between the inner and outer retorts insures that any gas flow existing between them as a result of leakage will be towards the outer retort and away from the panel.

It is a further most important object of our invention to provide a sandwich panel fabrication method which will eliminate the problems of contamination of brazing alloy and oxidization of the surfaces of intended securement while permitting the use of reference planes during the brazing cycle. Inherent in our process are: isolation of the reference planes from gaseous communication with the panel, and the use of a positive differential pressure between the inner and outer retorts to avoid the effect of leaks. We also desire to completely eliminate the necessity for preliminarily treating a graphite reference plane to decrease the quantity of absorbed contaminants.

It is a further object of our invention to insure acquisition of a continuous bond between the panel face sheets and a cellular core by assembling the outer retort cover sheets and panel face sheets, as well as all other elements therebetween, in face to face contact with one another and by applying a positive differential pressure across the cover sheet to urge the face sheet into continuous, intimate contact with the cellular core.

It is a further object of our invention to permit a substantial reduction in the massiveness of graphite required for use where it is desired to use graphite tooling during the complete brazing cycle. In this regard, the assembly of graphite sheets on opposite sides of the inner retort in contact with the outer retort cover sheets permits application of greater differential pressures across thinner graphite sheets than is true with conventional methods since the resulting compressive stresses are equally distributed. Reduction in the mass of graphite used directly reduces labor, material and power costs as well as eliminates adverse effects upon material physical properties. Our method will permit a sufficiently rapid cooling of the brazed panel from the brazing temperature through the critical metal matrix phase transformation region to avoid reduction in the desired physical properties of the metal.

It is another object of our invention to provide a honeycomb brazing method which will eliminate the necessity for employment of a running purge during the heating and cooling cycles, thereby effectuating a substantial economy in the use of an inert gas as a protective atmosphere during brazing and simultaneously accomplishing elimination, to a marked degree, of absorption of contaminants by the brazing or filler metal.

We also desire to provide a method which, through the use of thermally equivalent masses of graphite and copper glide sheets, or either of them, on opposite sides of the panel, effectively prevents the existence of thermal gradients throughout the honeycomb sandwich panel during its brazing cycle. When graphite is used in our method, it is assembled externally of the inner retort, while when copper is used, either alone or in conjunction with graphite, it may either be placed externally or internally of the inner retort.

It is also an object of our invention to provide an improved method for maintaining continuous contact between sandwich panel face sheets and the panel core by the transmission of a differential pressure through copper glide sheets to all points on the surfaces of the face sheets. It is still a further object of our invention to provide an improved method for brazing sandwich panel structures which permits the incorporation of metal inserts therein without leading to buckling, distortion or the formation of wrinkles.

These as well as further objects of our invention will become apparent from a consideration of the following description, as related to the drawing in which:

FIGURE 5 is a table comparing the conventional sand-seal method and our double differential method.

Figure 1:
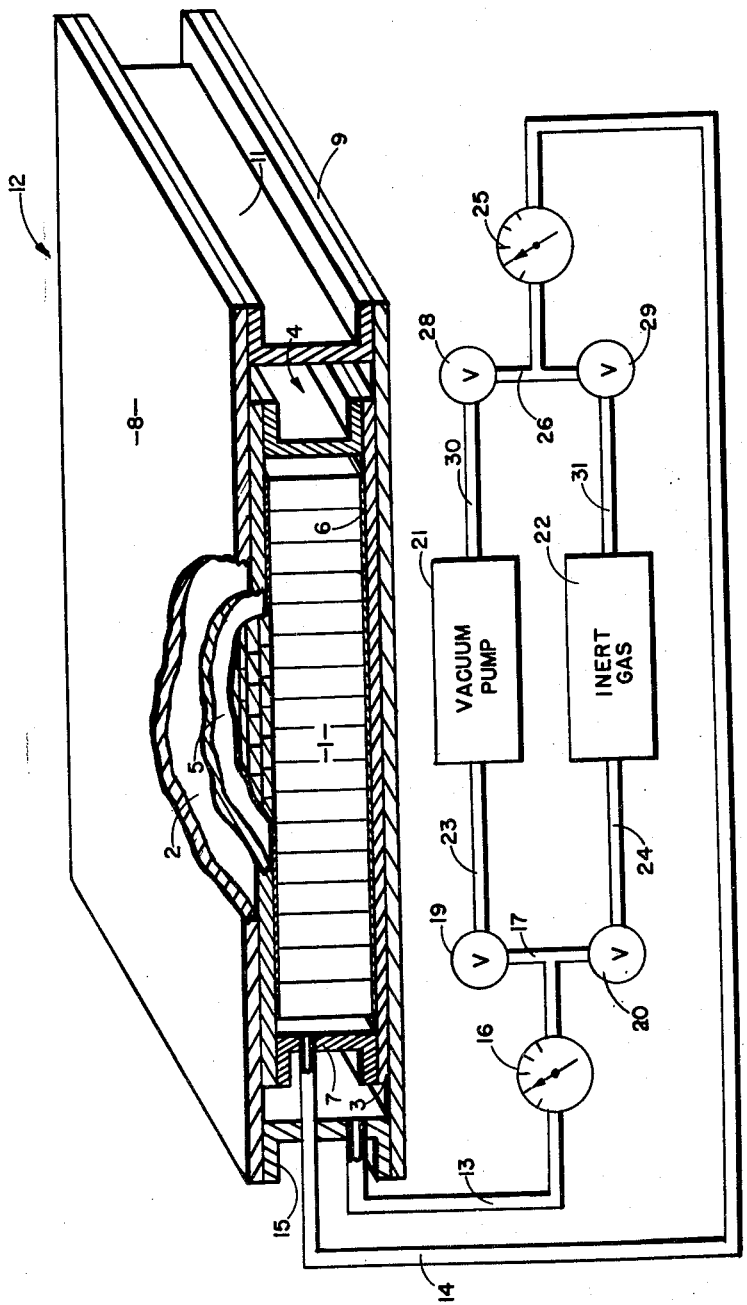
FIGURES 1 through 3 are each perspective views, partly in section and partly cut away for purposes of clarity, of different forms of retort arrangement of our invention, further schematically illustrating the purging apparatus.

In accordance with our method, the structural elements comprising the sandwich panel and the protective retort are first assembled in the sandwich relationship indicated in FIGURE 1. A cellular core 1, which may be constructed in any desired manner, is positioned between a pair of face sheets 2 and 3. Upon completion of the brazing operation, these face sheets will constitute the structural skins of the resulting panel, while during the brazing cycle they will constitute the cover sheets of the inner retort 4. Intermediately disposed between the cellular core 1 and each of the face sheets 2 and 3 are a pair of brazing alloy or filler metal sheets 5 and 6, which are of sufficient thickness to provide the required quantity of filler metal for formation of a complete bond between the cellular core and face sheets. The composition of the filler metal and its thickness do not fall within the scope of our invention. Nevertheless, a conventional alloy consisting of 92.3% silver, 7.5% copper and .2% lithium is preferred to be used in sheets .002" in thickness for core heights up to 1.5 inches and .003" in thickness for core heights in excess of this.

Panel face sheets 2 and 3 extend beyond the area of contact with the cellular core to furnish sufficient peripheral area externally thereof to receive the channel shaped edge close-out members 7. The channel shaped close-out members are of substantially no greater depth than the thickness of the cellular core in order to insure mutual conformance to shape of the face sheets and core.

Upon completion of assembly of the panel elements and close-out members, the retort is closed-off by sealingly securing the peripheral edges of the close-out members to the edges of the face sheets as by resistance seam or butt fusion welding.

After the inner retort 4 has been closed-off as above required, it is placed between a pair of outer retort cover sheets 8 and 9, to which are welded the U-shaped channel close-out members 11 in order to define the outer retort. Both the outer retort 12 and the inner retort 4 are provided with purge tubes 13 and 14 which communicate with the interior of the retorts. The purge tube 13 is welded directly to outer retort close-out 15 while the purge tube 14 is welded to inner retort close-out member 7, extended through outer retort close-out 15 and welded thereto. Purge tube 13 is connected through vacuum gage 16 to a T conduit 17 which is provided with needle valves 19 and 20. A vacuum pump 21 and an inert gas source such as an argon supply tank 22 are respectively connected to the T conduit 17 through the needle valves 19 and 20 by conduits 23 and 24. Purge tube 14 is similarly connected to vacuum pump 21 and inert gas source 22 through the vacuum gage 25, T 26, needle valves 28 and 29 and conduits 30 and 31. It will be evident that the arrangement illustrated will permit not only the evacuation of either or both retorts, but also the admission of argon or other inert gas to such retorts in whatever quantities are desired.

In order to remove oxidizing gases and moisture from the interiors of the two retorts and substitute an inert gas atmosphere therefor, a vacuum is drawn on the inner retort by closing valve 29, opening valve 28 and activating the vacuum pump 21. Evacuation is continued until the gage 25 indicates the exertion of approximately 28 to 29 inches of mercury of vacuum on the inner retort. Valve 28 is then closed and an inert gas introduced into the inner retort through the conduits 31 and 14 by opening needle valve 29 and holding it in an open position until the vacuum gage 25 indicates that the interior of the inner retort has reached atmospheric pressure. This cycle is then repeated a sufficient number of times to insure elimination of all oxidizing gases and moisture from the inner retort. We have found it preferable to repeat the above cycle seven times in order to insure acquisition of the inert gas atmosphere.

Substantially the same sequential operation is accomplished in order to purge the outer retort 12 of oxidizing gases and moisture. In this instance, vacuum pump 21 is energized after needle valve 20 has been closed and needle valve 19 opened. The same degree of vacuum is exerted on the outer retort prior to closing valve 19 and opening valve 20 in order to admit an inert gas from the source 22 into the outer retort.

Upon conclusion of the purging cycle, needle valves 19, 20, 28 and 29 are closed when the gages 16 and 25 respectively indicate an approximate vacuum of from 1 to 1½ inches of mercury and from ½ to 1 inch of mercury. It will thus be seen that the internal pressure of the inner retort exceeds the internal pressure of the outer retort by about a half an inch of mercury, gage.

The retort assembly is then placed within an electric or gas fired furnace which may be of any conventional design and subjected to continuous heating until brazing temperatures are obtained. During the heating cycle, the needle valves 19, 20, 28 and 29 are adjusted as may be required in order to maintain the pressure within the inner retort in excess of the pressure within the outer retort by approximately ½ inch of mercury and further to maintain the respective vacuums within the outer and inner retorts in the ranges of ½ to 1 and 1 to 1½ inches of mercury. It is preferred to employ a very low pressure differential between the inner retort and the atmosphere during heating to brazing temperature in order to permit relative movement between the assembly elements and avoid the development of locked-in stresses. Although these pressures can be maintained throughout the brazing cycle, it will be found desirable to substantially increase the vacuum within both the inner and outer retorts just after the panel has reached brazing temperature in order to cause the imposition of an increased differential pressure upon the face sheets and, in effect, set the face sheets with respect to the cellular core. In accomplishing this imposition of an increased differential pressure upon the face sheets and core, we prefer to decrease the pressure within the inner retort to about 7 inches of mercury and to decrease the pressure within the outer retort to approximately 9 inches of mercury. It will, nevertheless, be understood that the imposition of additional differential pressure upon the sandwich panel at brazing temperatures is not essential to the production of improved results in our method. It is further to be noted that the specific vacuums recited above are preferred rather than essential.

The retort assembly is removed from the furnace after the panel has reached brazing temperatures and the double retort enclosed sandwich panel positioned between a pair of cold platens so as to quench the assembly.

In accomplishing evacuation of the inner and outer retorts, as well as in increasing vacuum therein after achieving brazing temperature, care must be exerted not to cause imposition of differential pressures in excess of the compressive strength of the cellular core. Thus, in accomplishing the brazing of a sandwich panel having a cellular core constructed of a precipitation hardenable stainless steel such as 17-7PH which is 3/16 of an inch in depth and .001 of an inch in wall thickness, the maximum vacuum which can be tolerated within the inner retort at temperatures above 800° F. is approximately 6 inches of mercury. This vacuum gage setting corresponds to 23.8 inches of mercury at a temperature of 68° F. In fabricating a panel constructed of 3/16 inch by .001 inch pH steel core, it is therefore preferable to avoid evacuating the inner retort to more than 23.8 inches of mercury, gage, prior to immersing the retort assembly within a heat source. If this is not done, it will be necessary to increase the internal pressure of the retort at temperatures above 800° F. by introducing additional quantities of argon therein. Although it is desirable, after brazing temperature has once been achieved, to maintain the differential pressure between the atmosphere and the inner retort as high as is consistent with the compressive strength of the cellular core, we have obtained satisfactory braze results using differential pressures as low as ½ inch of mercury, where additional tooling was not used externally of the retort surfaces during the heating cycle.

The specific temperature to which the parent metals of the honeycomb panels must be raised will depend not only upon the specific metal of which they are constructed but also upon the nature of the brazing alloy. However, since our invention does not reside in a particular brazing alloy and since the specific temperature at which brazing can be accomplished with different metals and brazing alloys is readily determinable by routine experiment, the temperature to which the retort must be heated in the furnace in order to accomplish formation of an effective bond between the elements of the panel will be referred to as the brazing temperature. This term is intended to mean any temperature at which an effective bond between the cellular core and the surface sheets can be obtained.

Irrespective of the shape of the desired sandwich panel, the upper platen or die of a press is lowered into engagement with the upper surface of the outer retort. The outer retort cover sheets, and consequently the panel face sheets are thus maintained or held against displacement by retention means during the cooling cycle.

After the retort assembly has cooled to room temperature, it is removed from the retaining dies and the brazed honeycomb sandwich panel removed therefrom by cutting the cover sheets internally of the seam or butt welded edge but exteriorly of the cellular core. It will, nevertheless, be recognized that in some instances it may be desired to further heat-treat the panel, in which event the entire assembly can be so treated and the panel subsequently removed.

Figure 2:
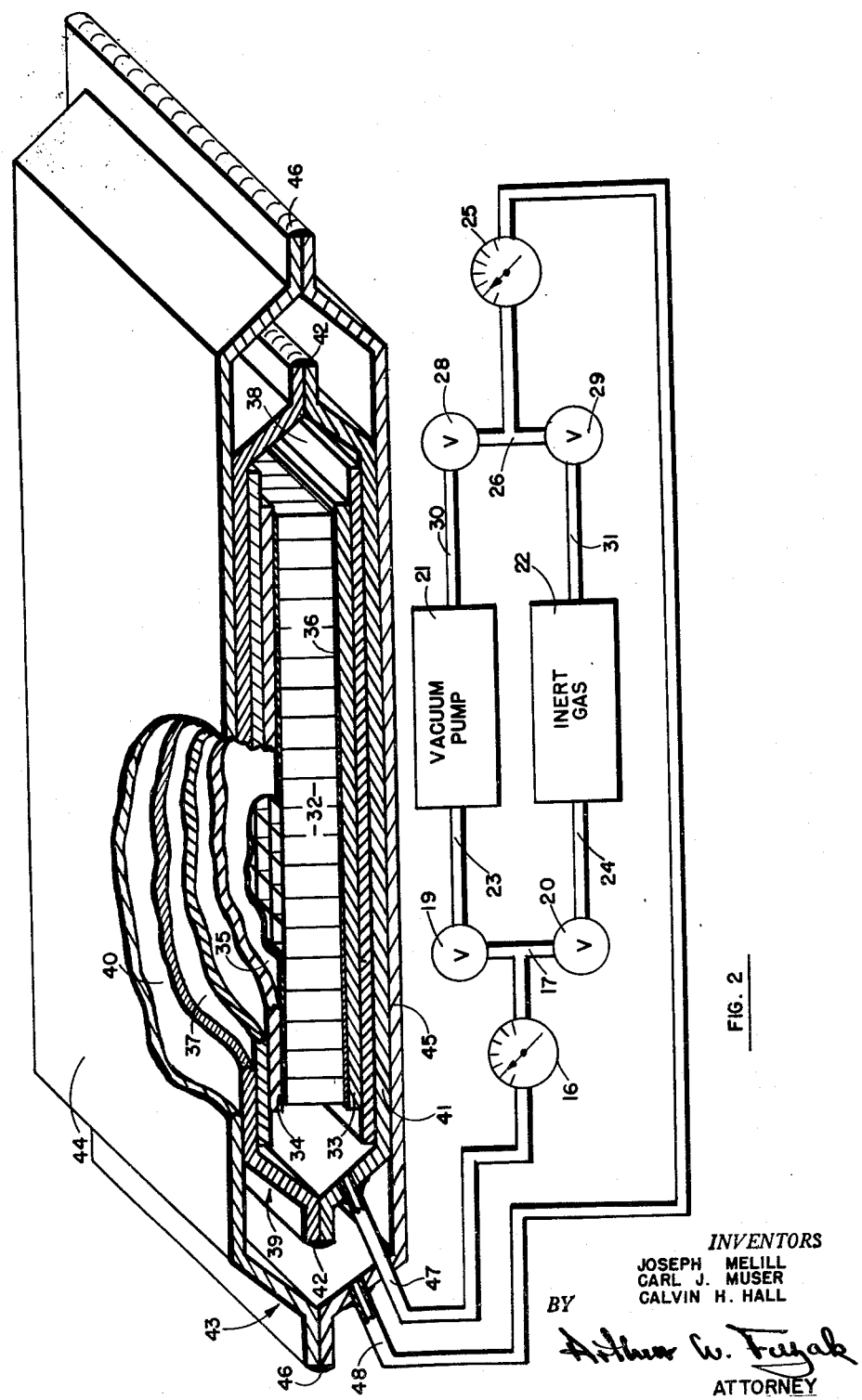

FIGURE 2 illustrates the retort and panel assembly of an alternative embodiment of our invention in which a pair of copper glide sheets are disposed internally of the inner retort in contact with the panel face sheets and the cover sheets of the inner retorts. Here, cellular core 32 is placed between a pair of face sheets 33 and 34 with filler metal sheets 35 and 36 being disposed between the face sheets and the cellular core. The core, filler metal sheets and face sheets are all of substantially the same size and configuration. A pair of copper glide sheets 37 and 38 are then placed in contact with panel face sheets 33 and 34. These glide sheets are of substantially the same size as the face sheets but may extend externally thereof if desired.

An inner retort 39 is generally constructed of a pair of cover sheets 40 and 41 which may be break-formed on their peripheral edges to the extent necessary to bring the edges into abutment with one another. These cover sheets 40 and 41 are in contact with the copper glide sheets 37 and 38 and are resistance seam or butt fusion welded as at 42 in order to provide an enclosing retort for the panel assembly. A second or outer retort 43 is then assembled to envelope the inner retort and its enclosed copper glide sheets. This retort may be constructed in all respects similarly to the inner retort in that cover sheets 44 and 45 can be break-formed along their edges to form mutually abutting retort edges which can be butt welded as at 46 in order to eliminate gaseous communication between the interior of the retort and the atmosphere.

As is true with the embodiment of FIGURE 1, both the inner and outer retorts 39 and 43 respectively are provided with metal purge tubes 47 and 48. The tube 47 is welded to cover sheet 41 of retort 39 and extends through cover sheet 45 of the outer retort. Purge tube 47 will also be welded to the cover sheet 45 of the outer retort, while purge tube 48 is simply welded to an opening in outer retort cover sheet 45.

Since the apparatus required for purging the inner and outer retorts is the same as that required with the embodiment of FIGURE 1, the description of this apparatus, its functioning, and the specific steps by which purging is accomplished will not be repeated. The purge apparatus is, nevertheless, shown and identified with the reference numerals used in FIGURE 1.

The copper glide sheets in this embodiment of our invention perform a dual function. The use of equivalent masses of copper, which has a high thermal conductivity, equalizes heat distribution throughout the panel during the heating and cooling cycles, thus preventing establishment of thermal gradients which are responsible for wrinkling, buckling and distortion of the panel and its face sheets. Furthermore, and of equal importance, is the fact that at the temperatures required for brazing stainless steel, titanium and other high temperature, high strength, corrosion resistant metal sandwich panels, copper possesses sufficient plasticity to flow into complete contact with all areas of the face sheet surfaces, thus resulting in the application of the differential pressure between the atmosphere and the interior of the retort to all points on the surface of the face sheets. The result is continuous contact of the internal surfaces of the face sheets with the cellular core during the critical period when the brazing alloy itself has sufficient plasticity to flow.

Although the embodiment of our invention illustrated in FIGURE 2 demonstrates the utilization of copper glide sheets internally of the inner retort, substantially similarly effective results may be obtained by placing the copper glide sheets externally of the inner retort, but internally of the outer retort in such manner that there is a direct contacting relationship between the cover sheets of the inner and outer retorts and the copper glide sheets.

When copper glide sheets are employed internally of the inner retort, it will be found preferable to utilize phosphorized or oxygen free copper in order to avoid contamination of the brazing alloy or oxidation of the surfaces to be brazed. Notwithstanding the necessity for using deoxidized rather than untreated copper when the copper glide sheets are positioned inside the inner retort, we prefer to so employ them in order to take fullest advantage of their thermal gradient equalizing characteristics.

Although the employment of copper glide sheets in the brazing of relatively simple sandwich panel structures of whatever configuration desired is most advantageous, their use in the brazing of panels having integrally included metal inserts is particularly advantageous. Where the cellular core is provided with a metal insert, the presence of copper glide sheets will eliminate otherwise severe thermal gradients during the brazing cycle.

Figure 3:
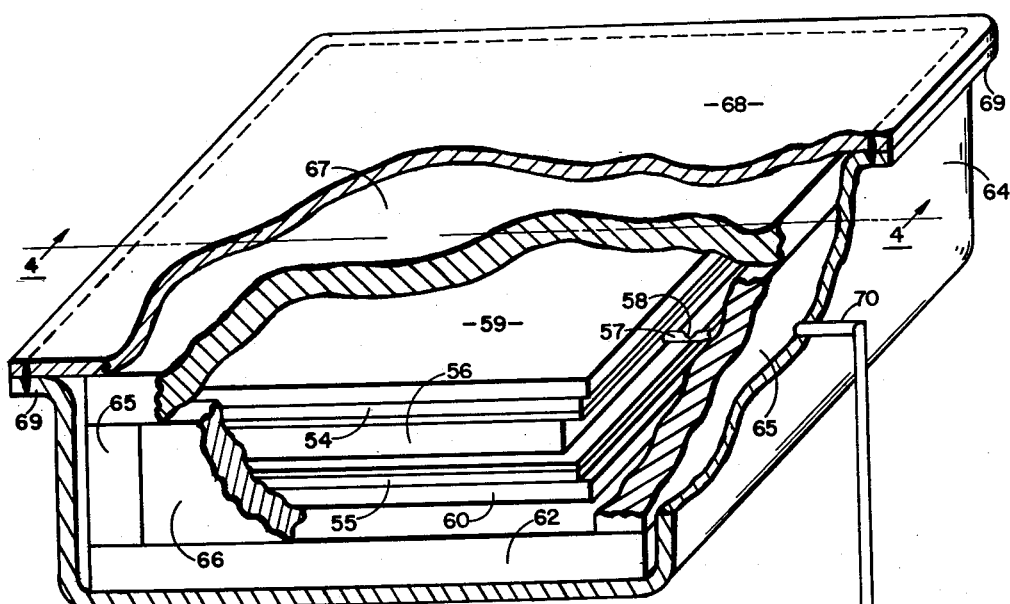
Figure 4:
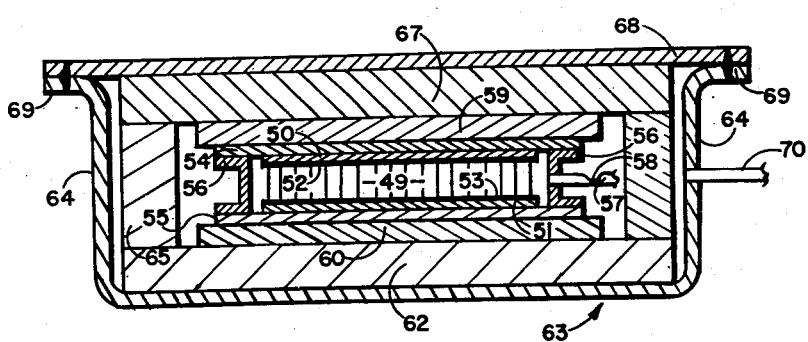
FIGURE 4 is a transverse section taken on the line 4—4 of FIGURE 3.

A further modification of our double differential pressure honeycomb panel brazing method utilizes the panel and double retort shown in FIGURES 3 and 4. The sandwich panel and inner retort of this modification are assembled in substantially the same manner as is true with the inner retort of FIGURE 2 except that the means for enclosing the inner retort constitute the U-shaped channel members used in closing out the retort of FIGURE 1. It will, nevertheless, be understood that the particular manner of closing or sealing the retorts is not critical. Cellular core 49 is assembled in sandwich panel relationship with panel face sheets 50 and 51, and filler metal sheets 52 and 53 are disposed intermediately between the face sheets and the cellular core. Inner retort cover sheets 54 and 55 contact the outer surfaces of the panel face sheets. The U-shaped close-out members 56, which are of a height substantially equal to the thickness of the sandwich panel, abut each of these cover sheets along their peripheral edges and are sealingly secured thereto as by seam or butt welding in order to provide a completely enclosed retort. A metal purge tube 57 is welded to one of the close-out members to provide communication between the interior and exterior of the retort.

The inner retort is purged in the same manner as that described for the purging accomplished with the inner retort of FIGURE 1. However, instead of maintaining communication with the inner retort throughout the brazing cycle, the inner retort may be evacuated to a vacuum gage setting of about 23 or 24 inches of mercury, depending upon the strength of the core at brazing temperature, and then inner retort purge tube 57 pinched-off as at 58 in the manner described in the co-pending application Serial No. 804,398, filed April 6, 1959 of J. Melill, R. A. Happe, S. G. Smithhart, C. H. Hall, and L. W. Myers entitled "Honeycomb Sandwich Panel Brazing" and filed of even date herewith. It is, nevertheless, presently preferred to maintain gaseous communication with the inner retort through the purge tube 57 in the same manner as practiced in connection with the FIGURES 1 and 2 embodiments of our invention. In such event, this purge tube will not be pinched off, but will communicate with a vacuum pump and inert gas source such as 21 and 22 through equipment such as the gage 25, T 26, needle valves 28 and 29 and conduits 30 and 31 of FIGURES 1 and 2. Inner retort purge tube pinch-off is shown in FIGURES 3 and 4 to emphasize the utilization of double differential pressure concepts in conjunction with a static atmosphere.

This panel enclosed retort is then placed between a pair of copper glide sheets 59 and 60 which are of substantially the same or somewhat greater size than the size of the cover sheets of the retort.

Even though, as pointed out above, the employment of graphite is contra-indicated because of its extreme tendency to contaminate the brazing surfaces, we have found that because of the double differential pressure concept of our invention, graphite reference planes may be utilized to extreme advantage in the fabrication of large panels. Prior to placing the inner retort within an outer retort, a graphite reference plane 62, whose surface is precision machined to provide the configuration of sandwich panel desired, is placed on the lower surface of the retort base member 63 which is U-shaped in cross-section. The retort base member 63 and graphite reference plane 62 are of sufficient size to permit retention of the inner retort and copper glide sheets while providing an annular space between the inner retort and the side walls 64 of the outer retort base member. Disposed within this space are graphite blocks 65 and 66 of substantially equivalent mass for the purpose of further insuring uniform heating and cooling rates. After the inner retort is placed within the outer retort base member on the reference plane 62, a second graphite reference plane 67 is placed upon the upper surface of copper glide sheet 59. The peripheral graphite masses 65 and 66 are sufficiently less in depth than the complete thickness of the inner retort and accompanying copper glide sheets to permit application of differential pressure between the atmosphere and the inner retort directly to glide sheets 59 and 60 without interference from the peripherally extending graphite masses. Finally, the outer retort cover sheet 68 is placed in contact with the upper reference plane 67 and welded to the laterally extending edges 69 of the outer retort base member. A metal purge tube 70 is welded to one of the sides 64 of the outer retort in order to provide communication between the interior and exterior of the retort. As shown in FIGURE 3, this purge tube 70 is connected through vacuum gage 25, T 26 and needle valves 28 and 29 respectively to the vacuum pump 21 and the inert gas source 22 so that purging of the outer retort can be accomplished in substantially the same manner as indicated above with respect to FIGURES 1 and 2. In view of the extreme tendency of the graphite reference planes and peripheral graphite masses to outgas as temperatures increase, the vacuum pump 21 will have to be in operation a somewhat greater proportion of the time than is true with the embodiment of FIGURES 1 and 2 in order to maintain the required pressure differential between the inner and outer retorts.

It is particularly important in practicing the method utilizing the retorts of FIGURE 3 and 4 that there be complete contact between adjacent faces of the cover sheets of the outer retort, the graphite reference planes, the copper glide sheets, the inner retort cover sheets and the panel face sheets. Unless the various elements are assembled in the stated relationship, the differential pressure between the atmosphere and the interior of the inner retort will not be effectively applied at the surface of joinder of the face sheets and the cellular core. The fact that this relationship is maintained permits the employment of graphite reference planes of substantially diminished thickness since the differential pressures applied are equally distributed throughout the reference planes. The use of decreased thickness graphite tooling will result in substantially diminishing the heating and cooling periods required to achieve brazing and will also result in greatly increased cooling rates thereby enabling the metal of which the sandwich panel is constructed to pass through the austenite-carbide phase region at a sufficiently rapid rate to avoid diminishment of physical properties of the panel.

Examples 1 and 2

FIGURE 5 summarizes the details of and demonstrates the advantages of our process as contrasted with the conventional sand-seal method described above. In these examples, a pair of honeycomb sandwich panels, identical in all respects, were fabricated by the conventional method and by our method. Each of the panels was 27 inches by 144 inches in size, while the core had cells ¼ of an inch in width, .0015 inch in cell wall thickness and ½ an inch in height. Both the cellular core and the face sheets of these panels were constructed of 17–7PH steel, and the brazing alloy employed was that described above.

The first step of our method involved assembling the cover sheets, face sheets, filler metal sheets, cellular core and edge close-out members in the manner indicated in FIGURE 3. The cover sheets were 32 inches by 150 inches while the face and filler metal sheets, as well as the core were 27 inches by 144 inches. The face sheets were .020 inch in thickness. After this, the close-out members, which were channel shaped elements .540 inch in depth and had ½ an inch flanges, and the cover sheet edges were sealed by seam welding in order to form a sealed inner retort enclosing the sandwich panel elements. This retort was then placed between a pair of ⅛ of an inch copper glide sheets within an outer retort, 72 inches by 132 inches in size, upon a machined graphite reference plane 1½ inches in thickness. Graphite blocks, 1 inch in depth by 2 inches in width, were placed peripherally around the inner retort and an equivalent graphite reference plane positioned over the uppermost copper glide sheet. A cover sheet was then welded to the outer retort so as to be in contact with one glide sheet. Both the inner and outer retorts were provided with a 321 steel, ¼ inch by .040 inch purge tube, each of which was connected through a gage to a T and to a vacuum pump and argon gas source therethrough. Vacuum and argon supply were controlled by a pair of needle valves in opposite ends of the T. Each of these retorts was then provided with an inert gas, static atmosphere through its metal purge tube by initially evacuating the retort to a gage pressure of 29 inches of mercury, introducing argon into the retort until the gage pressure therein reached atmospheric pressure, and repeating this cycle seven times to insure elimination of all oxidizing gases and moisture. The vacuums in the inner and outer retorts were respectively initially set at 4 inches and 10 inches. The extent of vacuum in the outer retort was controlled by regulating the needle valves to maintain a positive differential pressure between the inner and outer retorts of at least ½ inch of mercury during the heating and cooling cycles. The complete retort assembly was put in a gas fired furnace having a 20,000,000 B.t.u. thermal capacity and heated until the panel reached 1625° F. It was necessary to retain the retort assembly in the furnace for only 3 hours to reach brazing temperature and it required only another 3 hours to cool to room temperature. Finally, the retorts were opened by cutting the steel cover sheets interiorly of their seam welded edges, and the honeycomb sandwich panel inspected for deformation, the internal condition of the panel and the type of bond obtained.

Unlike the method of our invention, the conventional method shown in FIGURE 5 first required elimination of the impurities normally associated with graphite by cyclically subjecting the machined graphite reference planes to high temperatures in an inert gas, partial pressure environment. The cellular core, brazing alloy sheets and face sheets of the desired sandwich panel were then placed in assembled relationship on a graphite reference plane 3 inches thick, treated as above, and this assembly then placed in an inner retort base member provided with a pair of purge tubes. The inner retort was covered and sealed by welding the edges of the cover and the sides of the base member, and this retort then placed in an outer retort having an annular upstanding trough. A second graphite reference plane 3 inches thick was placed on the cover sheet of the inner retort. The depending flanges of the cover of the latter retort were then embedded within the sand contained in the annular trough to completely enclose the inner retort.

After the inner and outer retorts were closed as above indicated, the purge tubes to the inner retort were respectively connected to an argon source and a vacuum pump, while the single purge tube to the outer retort was connected to the argon gas source. Argon was introduced into the outer retort and continuously flowed therethrough at a sufficient rate to insure argon flow past the sand-seal. The pressure within this retort was very slightly greater than atmospheric, while the inner retort was maintained at a pressure slightly lower than atmospheric pressure (about 14.5 inches of mercury) by evacuating the retort through the vacuum pump and continuously introducing argon through the other purge tube. The retort and associated tubing were then placed within the same furnace utilized in the performance of our process and retained therein for a period of nine hours, which was the time required to obtain brazing temperatures within the honeycomb sandwich panel. The retort assembly was then removed from the furnace and permitted to cool to room temperature. Argon flowed into the inner and outer retort continuously during the heating and cooling cycles. After the retort assembly had cooled to room temperature, the retorts were opened and the brazed honeycomb sandwich panel removed. The panel was inspected with the aid of ultrasonic and X-ray equipment in order to determine the completeness and continuity of the bond between the cellular core and face sheets. In addition, it was visually compared, for deflection from the desired configuration, with the panel resulting from the practice of our method. It was apparent from these inspections that not only did the panel fabricated in accordance with our method conform more closely to the desired configuration, but also that the core to face sheet bond for our panel was continuous throughout, while several discontinuous areas, where substantially no bond was obtained, existed for the panel fabricated in accordance with the conventional sand-seal method.

Consideration of physical inspection test results, as well as the data contained on the table of FIGURE 5, demonstrated that not only is the panel constructed in accordance with our method possessed of superior physical properties but also that it can be fabricated with a very substantially reduced expenditure of time, labor, material and power.

Example 3

In order to further exemplify our process, a cellular core having a thickness of .750 of an inch, a wall thickness of .0015 of an inch and constructed of 17–7PH steel was assembled intermediately between a pair of face sheets of the same material which were 16 inches by 20 inches in size and .020 of an inch in thickness. A pair of sheets of brazing alloy comprised of the silver-copper-lithium alloy identified above were placed between the cellular core and each of the face sheets. The cellular core was 19 inches long by 15 inches wide, thus providing an annular space ½ an inch wide between the edges of the cellular core and the edges of the face sheets so that the channel shaped close-out members, which were .020 of an inch in thickness, .750 of an inch in depth and had flanges ½ an inch wide, could be secured between the face sheets in such annular space. After the close-out members had been sealed to the face sheets by seam welding, the resulting retort was placed between a pair of outer retort cover sheets 20 inches by 24 inches in size. These cover sheets were sealed together by welding channel close-out members, .790 inch in depth and having ½ inch flanges, to their peripheral edges. Each of the inner and outer retorts was provided with a steel purge tube connected through a vacuum gage and a pair of needle valves to a vacuum pump and an inert gas source. Both retorts were purged and an argon gas atmosphere substituted for that originally present by evacuating to a gage setting of 28 inches of mercury, shutting off the vacuum valve and opening the argon source valve to admit argon till internal pressure reached atmospheric. This cycle was repeated five times and the internal vacuum setting of the inner retort left at 1 inch of mercury while the vacuum gage setting of the outer retort was left at 1½ inches of mercury. The retort-panel assembly was then placed in an electric furnace, pre-heated to a temperature of 1630° F., and retained in the furnace for a total period of eight minutes. The hot panel was removed from the furnace and placed between the dies of a press. The transfer time between the furnace and press was thirty seconds while the dwell time between the platens required for reducing the panel to substantially room temperature was five minutes. The internal vacuum in the inner and outer retorts were respectively maintained at from 1 to 1½ inches and from 1½ to 2 inches of mercury during the heating and cooling cycles. After the close-out members were removed, it was observed that the panel was flat and that an excellent braze had been obtained in that even filleting of the filler metal existed for both the top and bottom panels and since no evidence existed of any oxidation of the core or the brazing alloy.

While our invention has been fully described and illustrated, it will be understood that this disclosure is for purposes of exemplification and is not to be taken by way of limitation, the spirit and scope of our invention being limited only by the terms of the accompanying claims.

We claim:

1. A method for fabricating a metal honeycomb sandwich panel having a pair of face sheets and a cellular core intermediately disposed therebetween and secured thereto which comprises: assembling said face sheets and said core in sandwich relationship and providing brazing alloy between said face sheets and said core to form a sandwich panel assembly; completely sealing said assembly from gaseous communication with the atmosphere except for a first purge tube; enclosing said sandwich panel assembly within a retort having a second purge tube so that the cover sheets of said retort are in differential pressure transmitting relationship with said face sheets; removing oxidizing gases and moisture from said assembly and from said retort through said first and said second purge tube and reducing the pressure within said assembly to a pressure less than atmospheric pressure but greater than the pressure within said retort; heating said retort to not less than the brazing temperature of said assembly while maintaining the pressure within said assembly at greater than the pressure within said retort but less than atmospheric pressure, and removing said assembly from said retort.

2. A method for fabricating a metal honeycomb sandwich panel having a pair of face sheets and a cellular core intermediately disposed therebetween and secured thereto which comprises: assembling said face sheets and said core in sandwich relationship and providing brazing alloy between said face sheets and said core to form a sandwich panel assembly; completely sealing said assembly from gaseous communication with the atmosphere except for a first purge tube; enclosing said sandwich panel assembly within a retort having a second purge tube so that the cover sheets of said retort are in differential pressure transmitting relationship with said face sheets; cyclically evacuating said assembly and said retort and admitting inert gas thereto until said assembly and said retort each have a substantially exclusively inert gas atmosphere; adjusting the pressures within said assembly and said retort so that the internal pressure within said assembly is greater than the pressure within said retort but less than atmospheric pressure; heating said retort to not less than the brazing temperature of said assembly while maintaining the pressure within said assembly at greater than the pressure within said retort but less than atmospheric pressure; cooling said assembly while restraining it from local displacement and maintaining the pressure within said assembly at greater than the pressure within said retort but less than atmospheric pressure, and removing said panel from said retort.

3. The method for fabricating a metal honeycomb sandwich panel of claim 2 in which the differential pressure between the atmosphere and the assembly is maintained below that at which said face sheets and said core are mutually displaceable by thermal expansion until the brazing temperature is reached and subsequently increasing said differential pressure to above that at which said face sheets and said core are mutually displaceable by thermal expansion.

4. The method for fabricating a metal honeycomb sandwich panel of claim 2 in which the vacuum within said assembly is maintained at from about 1 to 1½ inches of mercury and the vacuum within said retort is maintained at from about 1½ to 2 inches of mercury until said assembly reaches its brazing temperature and then the vacuum within said assembly is increased to about 6 inches of mercury and the vacuum within said retort is increased to about 9 inches of mercury.

5. A method for fabricating a metal honeycomb sandwich panel having a pair of face sheets and a cellular core intermediately disposed therebetween and secured thereto which comprises: assembling said face sheets and said core in sandwich relationship and proviging brazing alloy between said face sheets and said core to form a sandwich panel assembly; forming said sandwich panel assembly into an inner retort by sealing the peripheral edges of said face sheets together externally of said cellular core with sealing means and providing said retort with a first purge tube secured thereto; enclosing said inner retort within an outer retort having a second purge tube secured thereto so that the cover sheets of said outer retort are in differential pressure transmitting relationship with said face sheets; removing oxidizing gases and moisture from said inner and said outer retorts through said first and said second purge tubes and reducing the pressure within said inner retort to a pressure less than atmospheric pressure but greater than the pressure within said outer retort; heating said outer retort to not less than the brazing temperature of said inner retort while continuously maintaining the pressure within said inner retort at greater than the pressure within said outer retort but less than atmospheric pressure; cooling said assembly while restraining it from local displacement and continuously maintaining the pressure within said inner retort at greater than the pressure within said outer retort but less than atmospheric pressure, and removing said assembly from said inner and said outer retorts.

6. The method for fabricating a metal honeycomb sandwich panel of claim 5 which further comprises placing a copper glide sheet on either side of said inner retort in contact with said face sheets prior to enclosing said inner retort within said outer retort.

7. A method for fabricating a metal honeycomb sandwich panel having a pair of face sheets and a cellular core intermediately disposed therebetween and secured thereto which comprises: assembling said face sheets and said cellular core in sandwich relationship and providing brazing alloy between said face sheets and said core to form an assembled panel; enclosing said assembled panel within an inner retort having a first purge tube and further having a pair of opposed cover sheets so that said face sheets are adjacent to and contact said cover sheets; enclosing said inner retort within an outer retort having a second purge tube so that the cover sheets of said outer retort are in differential pressure transmitting relationship with said face sheets; removing oxidizing gases and moisture from said inner retort and from said outer retort through said first and said second purge tube and reducing the pressure within said inner retort to a pressure less than atmospheric pressure but greater than the pressure within said outer retort; heating said outer retort to not less than the brazing temperature of said inner retort while maintaining the pressure within said inner retort at greater than the pressure within said outer retort but less than atmospheric pressure; cooling said assembled panel while restraining it from local displacement and maintaining the pressure within said inner retort at greater than the pressure within said outer retort but less than atmospheric pressure, and removing said panel from said outer retort.

8. The method for fabricating a metal honeycomb sandwich panel of claim 7 which further comprises placing a copper glide sheet on either side of said inner retort in contact with the inner retort cover sheets prior to enclosing said inner retort within said outer retort.

9. The method for fabricating a metal honeycomb sandwich panel of claim 8 which further comprises assembling thermally equivalent masses of graphite peripherally around the edges of said inner retort and within said outer retort.

10. The method for fabricating a metal honeycomb sandwich panel of claim 7 which further comprises placing a deoxidized copper glide sheet within said inner retort between each of said face sheets and its adjacent inner retort cover sheet.

11. The method for fabricating a metal honeycomb sandwich panel of claim 7 which further comprises assembling a graphite reference plane on either side of said inner retort in contact with the outer retort cover sheets.

12. The method for fabricating a metal honeycomb sandwich panel of claim 11 which further comprises assembling thermally equivalent masses of graphite peripherally around the edges of said inner retort and within said outer retort.

13. The method for fabricating a metal honeycomb sandwich panel of claim 7 which further comprises assembling a copper glide sheet and a graphite reference plane within said outer retort on each side of said inner retort; said copper glide sheet being assembled in contact with the inner retort cover sheet and said graphite reference plane being assembled in contact with and sandwiched between said copper glide sheet and the outer retort cover sheets.

14. The method for fabricating a metal honeycomb sandwich panel of claim 13 which further comprises assembling thermally equivalent masses of graphite peripherally around said inner retort and within said outer retort.

15. A metal honeycomb sandwich panel-retort assembly which comprises a cellular core element, a filler metal sheet disposed on either side of said core element in contact therewith, a sandwich panel face sheet in surface abutting relationship with each of said filler metal sheets, a pair of retort cover sheets, each of said cover sheets being in surface abutting relationship with each of said face sheets and extending peripherally beyond the edges of said face sheets, said cover sheets being sealingly joined together to form an inner retort, a pair of outer retort cover sheets, each of said outer retort cover sheets being in contact with each of said inner retort cover sheets and extending beyond the edges of said inner retort cover sheets, said outer retort cover sheets being sealingly joined together to form an outer retort, a first purge tube, secured to, and in gaseous communication with the interior of, said inner retort, and a second purge tube secured to, and in gaseous communication with the interior of, said outer retort.

16. The retort-panel assembly of claim 15 in which the pressure within said inner retort is greater than the pressure within said outer retort but less than atmospheric pressure and in which said inner retort and said outer retort each contain an inert gas atmosphere.

17. The retort-panel assembly of claim 15 which further comprises a pair of graphite reference planes intermediately disposed between the cover sheets of said outer and said inner retorts.

18. The retort-panel assembly of claim 17 which further comprises a plurality of blocks of graphite disposed within said outer retort about the periphery of said inner retort.

19. The retort-panel assembly of claim 15 which further comprises a pair of copper glide sheets intermediately disposed between the cover sheets of said outer and said inner retorts.

20. The retort-panel assembly of claim 19 which further comprises a plurality of thermally equivalent graphite bars disposed within said outer retort and between the peripheral edges of said copper glide sheets.

21. The retort-panel assembly of claim 15 which further comprises a pair of copper glide sheets disposed on opposite sides of said inner retort in contact with the outer surfaces of said inner retort cover sheets and a pair of graphite reference planes disposed between and in surface contacting relationship with said copper glide sheets and said outer retort cover sheets.

22. The retort-panel assembly of claim 21 which further comprises a plurality of thermally equivalent graphite bars disposed within said outer retort and between the peripheral edges of said copper glide sheets.

References Cited in the file of this patent

UNITED STATES PATENTS 2,713,196    Brown _____ July 19, 1955

FOREIGN PATENTS 1,162,692    France _____ Apr. 14, 1958